(12) United States Patent
Wei Loon et al.

(10) Patent No.: US 6,564,292 B2
(45) Date of Patent: May 13, 2003

(54) OPTIMIZING ALLOCATION OF SECTORS IN DISC DRIVES

(75) Inventors: Ng Wei Loon, Singapore (SG); Ying Ee Yip, Singapore (SG); Beng Wee Quak, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 21 days.

(21) Appl. No.: 09/903,353

(22) Filed: Jul. 11, 2001

(65) Prior Publication Data

US 2002/0059276 A1 May 16, 2002

Related U.S. Application Data

(60) Provisional application No. 60/218,026, filed on Jul. 12, 2000.

(51) Int. Cl.⁷ .............................................. G06F 12/00
(52) U.S. Cl. ..................... 711/111; 711/112; 711/113; 711/171; 711/172; 710/52; 710/56
(58) Field of Search .................... 711/111, 112–113, 711/171, 172; 710/52, 56

(56) References Cited

U.S. PATENT DOCUMENTS

| | | | | |
|---|---|---|---|---|
| 5,375,233 A | | 12/1994 | Kimber et al. | 702/205 |
| 5,465,338 A | * | 11/1995 | Clay | 710/316 |
| 5,568,650 A | * | 10/1996 | Mori | 710/52 |
| 5,987,479 A | | 11/1999 | Oliver | 707/205 |
| 6,115,787 A | * | 9/2000 | Obara | 711/113 |

\* cited by examiner

*Primary Examiner*—Reginald G. Bragdon
*Assistant Examiner*—Mehdi Namazi
(74) *Attorney, Agent, or Firm*—Kirk A. Cesari

(57) ABSTRACT

Audio or video information is stored as data files in clusters or blocks of sectors on a magnetic disc. The data files are transferred from the disc drive to one or more buffers for respective data streaming applications. Optimal buffer size is calculated using operational parameters such as transfer rates and rotational latencies. The sectors are grouped in blocks having a size equivalent to, or slightly larger than, the size of an associated host buffer for the respective application to avoid fragmentation of the data used in each buffer fill, and thereby minimize the time required to fill the buffer from the disc drive.

18 Claims, 4 Drawing Sheets

OPTIMIZING ALLOCATION OF SECTORS IN DISC DRIVES

RELATED APPLICATIONS

The present application claims benefit of the U.S. provisional patent application No. 60/218,026, filed Jul. 12, 2000.

FIELD OF THE INVENTION

This invention relates generally to data storage in computer systems, and more particularly to optimizing the allocation of sectors for storage of audio and/or video data on magnetic discs.

BACKGROUND OF THE INVENTION

Magnetic discs are commonly used to store programs and data in computer systems, and in some computer-based consumer products. The discs are divided into physical sectors. A sector is a portion of a track on the disc, and represents the minimum physical storage unit on the disc. Sectors are commonly grouped together to form "blocks". Each block contains an integer number of sectors, and represents the minimum logical storage unit for a disc. Data is read from, or written to, a disc using a whole number of blocks. Block sizes are usually small in order to minimize wastage of memory space in disc blocks that are only partially filled.

When data is written to a disc, the file system normally attempts to allocate the data to blocks in sequential order, so that the writing and reading of the data can be performed efficiently, that is, with minimum movement of the read/write head. However, with subsequent deletion or modification of existing data files and writing of new data files, the blocks available for storage of data may no longer be contiguous. Consequently, a single data file may be stored in sectors in many different portions of the disc. Such fragmentation of data files is a common problem in computer systems.

Computer systems are now commonly used to store and process audio and video information in digital form. The rate at which audio and/or visual information is transferred to/from the disc drive of a computer system affects the system's overall performance. Particularly for audio and video applications, the processing of such audio/video information is time-critical, and sluggish drive performance will result in unacceptable audible and/or visual losses.

To ensure optimal performance, the audio/video information should ideally be written to sequential data sectors to avoid excessive movement of the read/write actuator in the disc drive. However, as mentioned above, repeated writing and deletion of data files will result in fragmentation of data. Consequently, the performance of the disc drive and the audio/video application can be adversely affected by excessive fragmentation of data sectors on the disc and poor allocation of the data file to the fragmented sectors. One common method of reducing file fragmentation in typical file systems used in general purpose operating systems is to use software utilities which reorganize the data files to minimize fragmentation. However, such utility programs provide only a temporary solution, and need to be repeated regularly if optimal performance of the disc drive is to be achieved.

U.S. Pat. No. 5,375,233 discloses a method of more efficient allocation of disc space to data files. In this method, the file system is divided into large blocks which are allocated to large files. Some of the large blocks are subdivided into small blocks which are allocated to small files. However, this system involves the additional step of characterizing each new file as a large file or a small file. Moreover, there may still be wastage due to the use of large size blocks, and read/write inefficiencies due to discontinues disc spaces which inevitably result from repeated deletion, modification and/or creation of files on the disc.

U.S. Pat. No. 5,987,479 teaches a method of allocating block sizes in a disc-based file system depending on the size of the files written to the disc and the operating parameters of the disc drive. In one embodiment, the minimum block size is chosen such that for a given set of files, the largest file is written to consecutive addresses on the disc, that is, within one block, so that fragmentation is reduced below a particular threshold. However, if there is an abnormally large file in the set, this would result in an unduly large block size and consequent inefficient use of disc space.

U.S. Pat. No. 5,987,479 also teaches a method for selecting block size so that fragmentation is reduced below a particular threshold to guarantee that an application will not fail due to file fragmentation. The minimum block size is calculated using application input/output bandwidth requirements, disc transfer rates and seek times. Although the formula for calculating minimum block size taught in the U.S. Pat. No. 5,987,479 reduces the problem of file fragmentation, the formula may not result in optimal block size, particularly for audio and video applications. Moreover, the block size is calculated without reference to the size of any associated buffer.

The present invention provides a solution to this and other problems, and offers other advantages over the prior art.

SUMMARY OF THE INVENTION

One embodiment of the present invention provides a system for optimizing the allocation of sectors in disc drives, particularly for audio and/or video data, by determining the optimal host buffer size required for an audio and/or video application, and then grouping data sectors sequentially in blocks equivalent to the host buffer size.

Another embodiment of the present invention provides computer apparatus having a data storage device in which data is operatively stored in storage elements grouped sequentially into blocks which represent minimum logical storage units, and at least one buffer adapted to receive data from the data storage device for subsequent transfer in a data stream to a respective application, where the size of the blocks is determined to be equal to or slightly greater than the size of the buffer.

The term "computer apparatus" is intended to include not only a computer system, but also a computer-based consumer product, for example, for audio and/or video applications, having a data storage device and associated buffer(s).

Another embodiment of the present invention provides a method of allocation of the storage elements in the data storage device for data storage, the method comprising grouping the storage elements sequentially into blocks which represent the minimum logical storage units, the size of the blocks being equal to or slightly greater than the size of the buffer.

The invention is particularly suitable for audio/video applications. Since the size of each block is equal to, or slightly greater than, the size of the buffer, the buffer can be filled by data obtained from sequential storage elements in a single block. The problem of fragmentation is avoided, thereby reducing the time required for filling the buffer, and avoiding audio/video losses.

In another embodiment, the optimal size of the buffer can be determined from the rate of data transfer from the storage device to the buffer, the rate of data transfer in the data stream from the buffer to the respective application, the number of data streams to be supported, and the worst case data access time for the storage device.

Typically, the data storage device is a magnetic disc such as found in a disc drive of a computer system, and the storage elements are sectors of the disc.

Other features and advantages of the present invention will be apparent from the accompanying drawings and from the detailed description of the embodiments illustrated by those drawings. Such embodiments are provided by way of example, without limiting the scope of the invention.

DETAILED DESCRIPTION

Figure 1:
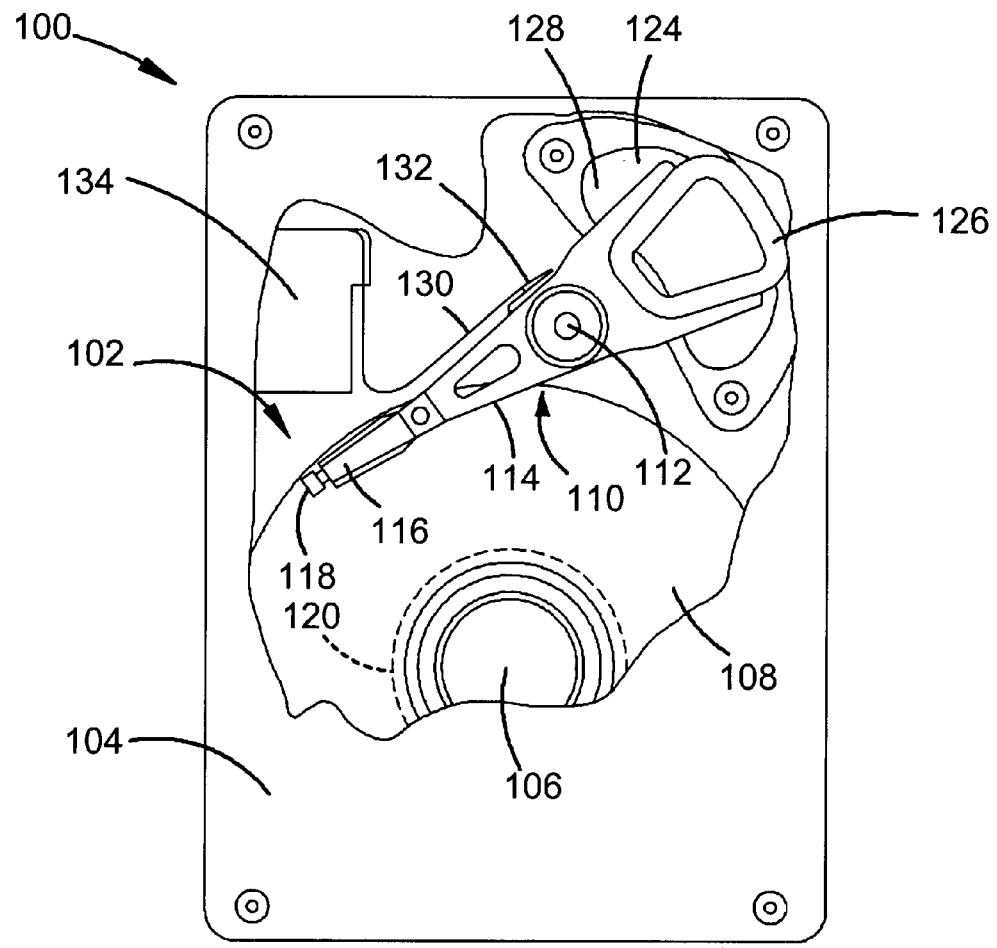
FIG. 1 is a top view of an exemplary disc drive in which preferred embodiments of the present invention are implemented.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Computer systems are now commonly used to store and process audio and video information in digital form. Such audio/video information is normally stored in data files on a disc of a computer system. When required in audio and video applications, the data files are transferred from the disc drive to an output port of the computer system from where the information is usually transmitted or "streamed" at a predetermined rate, depending on the particular application. For example, audio is typically streamed at 352 kilobits per second (Kb/s) per channel. Moving Pictures Experts Group (MPEG)-1 video compact disc (CD) data is typically transmitted at 1.5 megabits per second (Mb/s), while high-definition television (HDTV) MPEG-2 data is streamed as high as 96 Mb/s.

Figure 2:
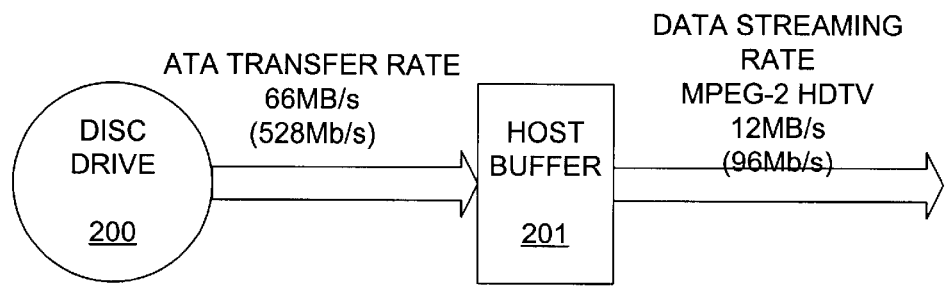
FIG. 2 is a block diagram of part of a computer system in which data is transferred from a disc drive to a host buffer for subsequent transfer to an application, according to one embodiment of the invention.

The streaming rates are below the internal data transfer rates of disc drives in modern computer systems. Data buffers, sometimes referred to as host buffers, are therefore commonly used in the computer systems to regulate the different data streaming rates, as illustrated in FIG. 2. Such buffers are typically part of the random access memory of the computer system. In some applications, the data buffers may be used in a consumer product in which the audio/video application is being run.

As shown in FIG. 2, an application such as MPEG-2 HDTV may require data streamed at a rate of 12 megabytes per second (MB/s) [or 96 Mb/s for an 8 bit byte]. Since the internal transfer rate of data from the disc drive is significantly higher, e.g. 66 MB/s (528 Mb/s), data is transferred intermittently from a disc drive 200 to a host buffer 201 which temporarily stores for the current data stream required by the audio/video application. The size of the host buffer 201 will determine the period of time between data transfers from the disc drive 200 and hence the amount of time which the disc drive 200 has available to perform other tasks. For example, if data is streaming out from the host buffer at 12 MB/s, a host buffer size of 12 MB will give the disc drive about one second to attend to other demands.

Figure 3:
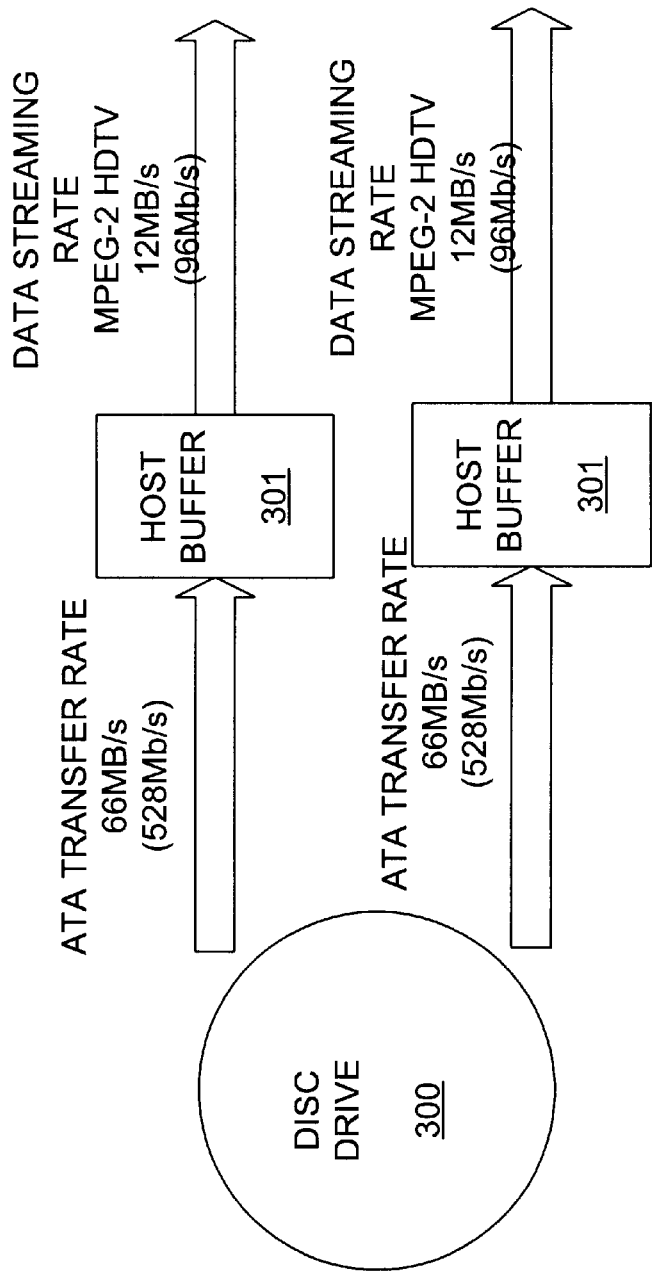
FIG. 3 is a block diagram of part of a computer system in which data is transferred from a disc drive to two buffers for subsequent transfer to respective applications, according to a second embodiment.

Due to the relatively high internal data transfer rates of disc drives, the disc drive can supply more than one data stream, e.g. for several audio/video applications, as illustrated schematically in FIG. 3. In that drawing, data is transferred from disc drive 300 to two separate buffers 301, 302 from which data is streamed for respective applications.

Where several host buffers are being supplied with data from the disc, the size of each buffer is chosen taking into account the time required to fill the other host buffer(s). For example, in the dual buffer system illustrated in FIG. 3, if the time required to fill each buffer is 0.5 seconds taking into account the drive response time and the data transfer rate from the disc to the host buffer, the size of the buffer is made large enough to provide at least 0.5 seconds for the disc drive to fill the other buffer. Usually, a much larger buffer size is allocated to allow additional time for the disc drive to fill the data buffer in case it needs to perform error recovery on sectors which are read or written incorrectly.

Figure 4:
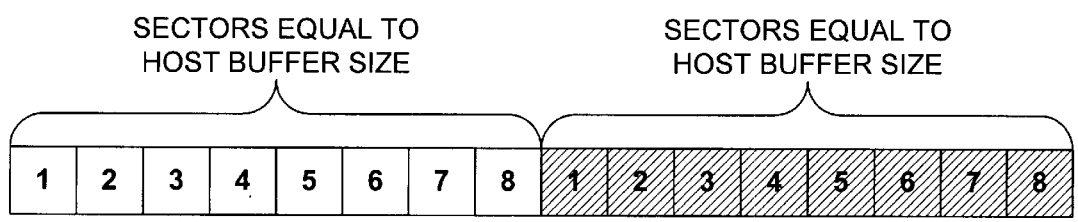
FIG. 4 illustrates the grouping of data sectors in blocks equal to host buffer size.

It is desirable to fill a host buffer in the least possible time. This then allows additional time for the disc drive to perform error recoveries or otherwise provide some redundancy to avoid audio and/or video loss. (The additional "free" time may also be used by the disc drive to perform other functions, or to support other applications). One of the factors affecting the time required to transfer data from the disc to a host buffer is the degree of fragmentation of the audio/video data on the disc. To optimize the allocation of sectors on the disc drive, particularly for audio/video applications, the sectors on the disc are grouped into clusters or blocks of a size equivalent to, or slightly larger than, the size of the host buffer that is used to store read look ahead data for the corresponding information stream. For example, as shown in FIG. 4, if each sector on a disc stores 512 data bytes, and the read look ahead host buffer has a capacity of 4096 bytes, 8 data sectors will be grouped into a cluster or block for storing the audio/video data for that particular application.

The size of the host buffer can be calculated from the following parameters:

AVR: the streaming rate of the audio/video data for the application receiving the data from the host buffer (bits per second).

N: the number of simultaneous data streams to be obtained from the disc.

DDR: the data transfer rate from the disc drive (bps).

ACC: the worst case data access time of the disc drive, calculated as being the worst case seek time plus latency i.e. the time taken for one disc revolution (seconds).

If the host buffer size is say, X bits, the time taken to empty the host buffer (TE) will be X/AVR seconds. The time taken to fill the buffer (TF) will be ACC+X/(DDR−AVR). To avoid any audio/video loss, TF should not take longer than TE/N. To determine the size of the buffer (X) therefore, since TF<TE/N then ACC+X/(DDR−AVR)<X/(N*AVR)

and X>ACC.(N.AVR.DDR−N.AVR$^2$)/(DDR−AVR−N.AVR)

The above calculation is based on the assumption that no retries of the disc drive's read or write operations are required. For each disc drive read or write retry, the time taken is typically around one disc revolution, or R seconds. To accommodate disc drive retries, the size of the host buffer can be increased by R/AVR for each permitted retry. For example, if allowance is made for 8 read or write retries per buffer fill, the size of the buffer is increased by 8R/AVR. By grouping sectors together in a block size equivalent to (or slightly greater than) the size of the corresponding host buffer, the sectors accessed by the disc drive read/write head during a buffer fill operation will be sequential, thereby avoiding unnecessary movement of the disc drive's read/write actuator and thereby minimizing the time required to fill the buffer. That is, since the sectors are grouped together in block sizes of at least the size of the buffer to be filled, the buffer can be filled from a single block and the possibility of relevant data sectors being located in different extreme sections of the disc is eliminated.

For some applications with high streaming rates, such as HDTV MPEG-2, the host buffer, and consequently the block size, may be relatively large. Such large block size would not be particularly suitable if large numbers of small data files are to be stored on the disc, as the remainder of the sectors in the block will not be used, and there may be inefficient use of space. One solution to this disadvantage is simply to partition the drive into two areas, one specifically for small data file storage (with small block size), and the other for storage of audio/video data (which may have a larger block size).

Further, additional partitions can be created for buffers supplying data streams of different streaming rates. For example, if a disc drive is supplying a video compact disc (VCD) stream at 1.5 Mb/s, and a digital video drive (DVD) stream at 5 Mb/s, separate partitions can be created in the disc for the data of the respective streams, and the optimal buffer sizes calculated for each different stream. Different block sizes can be used in the two partitions, dependent upon the respective host buffer sizes determined for each stream.

The calculation of the buffer size and/or allocation of block sizes can be implemented by a central processing unit (CPU) in the computer system, utilising suitable software. One embodiment of the invention provides a method of optimizing the allocation of sectors for storage of audio and/or video data in discs, by grouping the sectors in blocks having a size equal to, or slightly greater than, the host buffer used for the corresponding application. The invention also provides a method for determining the optimal host buffer size.

Although the invention has been described with particular reference to audio/video applications, it may also be applied to other applications where efficient storage and retrieval of data from a mass storage device is required. Further, although the invention has been described with particular reference to grouping of data sectors on a disc, the invention is also applicable to block size allocation in other magnetic storage devices, such as floppy discs and tape drives, as well as optical and magneto-optical data storage devices.

Figure 5:
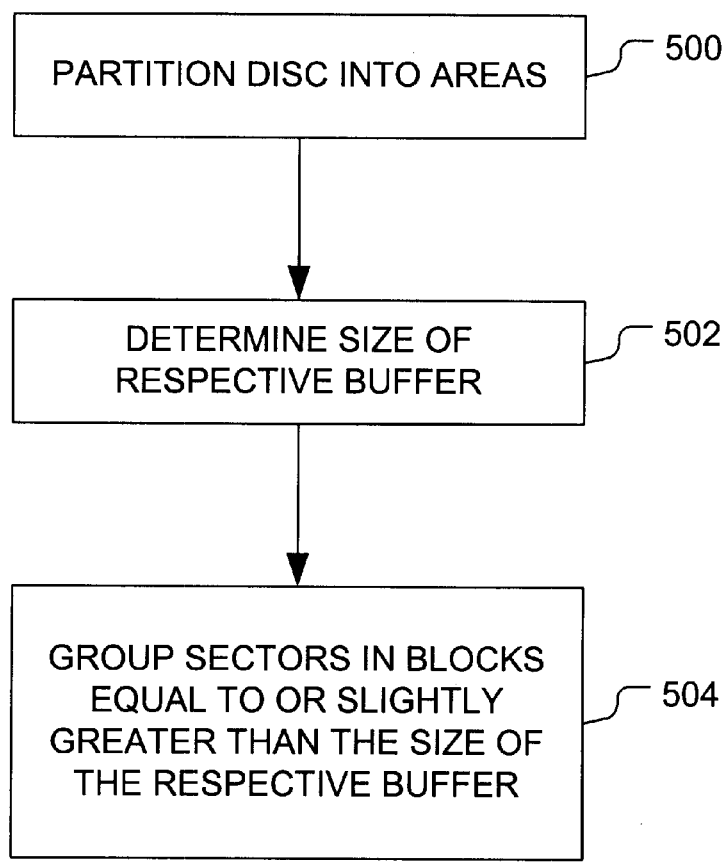
FIG. 5 is a flow diagram illustrating a method of optimizing the allocation of sectors according to one embodiment of the present invention.

Alternatively, embodiments of the present invention may be described as follows, with reference to FIG. 5:

In a computer apparatus having a data storage device (200, 300) in which data is stored in storage elements, there is provided at least one buffer (201, 301) adapted to receive data from the data storage device for subsequent transfer in a data stream to a respective application. The present invention provides for a method of allocation of storage elements for data storage which includes a step of grouping the storage elements sequentially into blocks which represent the minimum logical storage units (step 504). The size of the blocks is set to be equal to or slightly greater than the size of the buffer.

The data storage device is preferably a magnetic disc and the storage elements are preferably sectors of the disc. The method may further include a step of determining the size of the buffer (step 502) from the rate of data transfer from the storage device to the buffer, the rate of data transfer from the buffer to the respective application, the number of data streams to be supported, and the worst case data access time for the magnetic disc. The minimum size of the buffer can be determined as ACC.(N.AVR.DDR−N.AVR$^2$)/(DDR−AVR−N.AVR) where: AVR is the rate of data transfer in the data stream the buffer to its respective application, DDR is the data transfer rate from the disc drive to the buffer, N is the number of simultaneous data streams to be supported, and ACC is the worst case data access time for the magnetic disc. The worst case data access time can be calculated as being the worst case seek time plus the time taken for one revolution of the disc.

In one embodiment, the minimum buffer size is determined as ACC.(N.AVR.DDR−N.AVR$^2$)/(DDR−AVR−N.AVR) plus R/AVR for each of a predetermined number of permitted retries of read/write operations during data transfer from the disc to the buffer, where R is the time taken for one revolution of the disc.

The invention may further include steps of partitioning the data storage device into plural areas for respective applications (step 500), determining the size of the respective buffers for receiving data from the plural areas (step 502), and determining the size of the blocks in each area to be equal to or slightly greater than the size of the respective buffer receiving data from that area (step 504).

It is to be understood that even though numerous characteristics and advantages of various embodiments of the present invention have been set forth in the foregoing description, this disclosure is illustrative only, and changes may be made in detail without departing from the scope and spirit of the present invention.

What is claimed is:

1. A computer apparatus comprising:
   a data storage device in which data is operatively stored in storage elements grouped sequentially into blocks which represent minimum logical storage units; and
   at least one buffer adapted to receive data from the data storage device for subsequent transfer in a data stream to a respective application, wherein the size of the blocks is determined to be equal to or slightly greater than the size of the buffers;
   wherein the size of the buffer is determined from the rate of data transfer from the storage device to the buffer, the rate of data transfer in the data stream from the buffer to the respective application, the number of data streams to be supported, and the worst case data access time for the data storage device.

2. An apparatus as claimed in claim 1, wherein the data storage device is a magnetic disc and the storage elements are sectors of the disc.

3. An apparatus as claimed in claim 1, wherein the minimum size of the buffer is determined as
   ACC.(N.AVR.DDR−N.AVR$^2$)/(DDR−AVR−N.AVR)
   where:
   AVR is the rate of data transfer in the data stream from the buffer to its respective application,
   DDR is the data transfer rate from the disc drive to the buffer,
   N is the number of simultaneous data streams to be supported, and
   ACC is the worst case data access time for the magnetic disc.

4. An apparatus as claimed in claim 3, wherein the worst case data access time for the magnetic disc is calculated as being the worst case seek time plus the time taken for one revolution of the disc.

5. An apparatus as claimed in claim 3, wherein the minimum buffer size is ACC.(N.AVR.DDR−N.AVR$^2$)/(DDR−AVR−N.AVR), plus R/AVR for each of a predetermined number of permitted retries of read/write operations during data transfer from the disc to the buffer, R being the time taken for one revolution of the disc.

6. An apparatus as claimed in claim 1 wherein the data storage device is partitioned into plural areas, the apparatus including buffers for receiving data from the respective plural areas, wherein the size of the blocks in each area is determined to be equal to or slightly greater than the size of the respective buffer receiving data from that area.

7. In a computer apparatus having a data storage device in which data is stored in storage elements, and at least one buffer adapted to receive data from the data storage device for subsequent transfer in a data stream to a respective application, a method of allocation of storage elements for data storage comprising steps of:
   (a) grouping the storage elements sequentially into blocks which represent the minimum logical storage units, the size of the blocks being equal to or slightly greater than the size of the buffer; and
   (b) determining the size of the buffer from a rate of data transfer from the storage device to the buffer, a rate of data transfer from the buffer to the respective application, a number of data streams to be supported, and a worst case data access time for the data storage device.

8. A method as claimed in claim 7, wherein the data storage device is a magnetic disc and the storage elements are sectors of the disc.

9. A method as claimed in claim 8, wherein the minimum size of the buffer is determined as
   ACC.(N.AVR.DDR—N.AVR$^2$)/(DDR−AVR−N.AVR)
   where:
   AVR is the rate of data transfer in the data stream the buffer to its respective application,
   DDR is the data transfer rate from the disc drive to the buffer,
   N is the number of simultaneous data streams to be supported, and
   ACC is the worst case data access time for the magnetic disc.

10. A method as claimed in claim 9, wherein the worst case data access time for the magnetic disc is calculated as being the worst case seek time plus the time taken for one revolution of the disc.

11. A method as claimed in claim 9, wherein the minimum buffer size is determined as ACC.(N.AVR.DDR−N.AVR$^2$)/(DDR−AVR−N.AVR) plus R/AVR for each of a predetermined number of permitted retries of read/write operations during data transfer from the disc to the buffer, R being the time taken for one revolution of the disc.

12. A method of allocation of storage elements for data storage in a data storage device comprising:
   (a) grouping the storage elements sequentially into blocks which represent minimum logical storage units, the size of the blocks being equal to or slightly greater than the size of a respective buffer
   (b) partitioning the data storage device into plural areas for respective applications;
   (c) determining the size of the respective buffers for receiving data from the plural areas; and
   (d) determining the size of the blocks in each area to be equal to or slightly greater than the size of the respective buffer receiving data from that area;
   wherein the size of the respective buffers are determined from the rate of data transfer from the storage device to the buffer, the rate of data transfer in the data stream from the buffer to the respective application, the number of data streams to be supported, and the worst case data access time for the data storage device.

13. A method of determining buffer size in a computer system apparatus having a data storage device and at least one buffer adapted to receive data from the data storage device for subsequent transfer in a data stream to an application, wherein the buffer size is determined as being a minimum of $ACC.(N.AVR.DDR-N.AVR^2)/(DDR-AVR-N.AVR)$ where:

AVR is the rate of data transfer in the data stream from the buffer to its respective application, DDR is the data transfer rate from the data storage device to the buffer, N is the number of simultaneous data streams to be supported, and ACC is the worst case data access time for the data storage device.

14. A method as claimed in claim 13, wherein the data storage device is a magnetic disc and ACC is calculated as being the worst case seek time for the disc drive plus the time taken for one revolution of the magnetic disc.

15. A method as claimed in claim 14, wherein the minimum buffer size is $ACC.(N.AVR.DDR-N.AVR^2)/(DDR-AVR-N.AVR)$ plus R/AVR for each of a predetermined number of permitted retries of read/write operations during data transfer from the disc to the buffer, R being the time taken for one revolution of the disc.

16. A method as claimed in claim 13, wherein the data is audio or video information, and the application is an audio or video application.

17. A method as claimed in claim 13, wherein the data storage device is partitioned into plural areas and the computer apparatus includes buffers for receiving data from respective plural areas, the method including a step of determining the size of each of the buffers as being a minimum of $ACC.(N.AVR.DDR-N.AVR^2)/(DDR-AVR-N.AVR)$ where:

AVR is the data transfer rate from the respective buffer to its application,

DDR is the data transfer rate from the storage device to that buffer,

N is the number of simultaneous data streams to be supported, and

ACC is the worst case data access time for the data storage device.

18. A method as claimed in claim 17, wherein the minimum size of each buffer is $ACC.(N.AVR.DDR-N.AVR^2)/(DDR-AVR-N.AVR)$ plus R/AVR for each of a predetermined number of permitted retries of read/write operations during data transfer from the disc to the buffer, R being the time taken for one revolution of the disc.

* * * * *